United States Patent
Gou et al.

(10) Patent No.: US 11,203,682 B2
(45) Date of Patent: Dec. 21, 2021

(54) ETHYLENE-METHOXY POLYETHYLENE GLYCOL METHACRYLATE COPOLYMERS

(71) Applicant: Dow Global Technologies LLC, Midland, MI (US)

(72) Inventors: Qian Gou, Collegeville, PA (US); Manish Talreja, Collegeville, PA (US); Bharat Chaudhary, Collegeville, PA (US); John Osby, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/625,940

(22) PCT Filed: Jun. 12, 2018

(86) PCT No.: PCT/US2018/037038
§ 371 (c)(1),
(2) Date: Dec. 23, 2019

(87) PCT Pub. No.: WO2019/005470
PCT Pub. Date: Jan. 3, 2019

(65) Prior Publication Data
US 2020/0148866 A1 May 14, 2020

Related U.S. Application Data

(60) Provisional application No. 62/526,434, filed on Jun. 29, 2017.

(51) Int. Cl.
| | | |
|---|---|---|
| C08F 210/02 | (2006.01) | |
| C08F 220/28 | (2006.01) | |
| C08K 5/00 | (2006.01) | |
| C08K 5/14 | (2006.01) | |
| C08L 23/06 | (2006.01) | |
| C08L 71/02 | (2006.01) | |
| H01B 3/44 | (2006.01) | |

(52) U.S. Cl.
CPC ............ *C08L 23/06* (2013.01); *C08F 210/02* (2013.01); *C08F 220/286* (2020.02); *C08K 5/005* (2013.01); *C08K 5/14* (2013.01); *C08L 71/02* (2013.01); *H01B 3/447* (2013.01); *C08L 2203/202* (2013.01); *C08L 2205/02* (2013.01); *C08L 2207/066* (2013.01)

(58) Field of Classification Search
CPC .... C08F 10/02; C08F 210/02; C08F 220/286; C08F 220/285
See application file for complete search history.

(56) References Cited

U.S. PATENT DOCUMENTS

| | | |
|---|---|---|
| 3,499,791 A | 3/1970 | Maloney |
| 3,795,646 A | 3/1974 | MacKenzie |
| 3,956,420 A | 5/1976 | Kato et al. |
| 4,018,852 A | 4/1977 | Schober |
| 4,101,445 A | 7/1978 | Levine et al. |
| 4,144,202 A | 3/1979 | Ashcraft et al. |
| 4,206,260 A | 6/1980 | McMahon |
| 4,302,565 A | 11/1981 | Goeke et al. |
| 4,370,517 A | 1/1983 | Soma et al. |
| 4,812,505 A | 3/1989 | Topcik |
| 4,937,299 A | 6/1990 | Ewen et al. |
| 5,246,783 A | 9/1993 | Spenadel et al. |
| 5,317,036 A | 5/1994 | Brady, III et al. |
| 5,332,793 A | 7/1994 | Cann |
| 5,342,907 A | 8/1994 | Cann et al. |
| 5,346,961 A | 9/1994 | Shaw et al. |
| 5,371,145 A | 12/1994 | Daniell et al. |
| 5,405,901 A | 4/1995 | Daniell et al. |
| 5,410,003 A | 4/1995 | Bai |
| 5,959,055 A * | 9/1999 | Le Blevec ............ C08F 210/02 526/318.42 |
| 6,274,239 B1 | 8/2001 | Peruzzotti et al. |
| 6,496,629 B2 | 12/2002 | Ma et al. |
| 6,714,707 B2 | 3/2004 | Rossi et al. |
| 8,269,109 B2 | 9/2012 | Hampton et al. |
| 9,058,918 B2 | 6/2015 | Caronia et al. |
| 2010/0319959 A1* | 12/2010 | Eaton .................. C08L 2666/02 174/110 SR |
| 2012/0031641 A1 | 2/2012 | Svensson |
| 2016/0046885 A1* | 2/2016 | Cosimbescu ........ C10M 145/22 508/466 |

(Continued)

FOREIGN PATENT DOCUMENTS

| | | |
|---|---|---|
| EP | 0179565 A2 | 4/1986 |
| EP | 179845 B1 | 8/1989 |
| EP | 0966003 B1 | 10/2006 |
| EP | 1731565 A1 | 12/2006 |
| EP | 2439234 B1 | 4/2013 |
| WO | WO 2016173890 A1 * | 11/2016 |
| WO | 2016204949 A1 | 12/2016 |

OTHER PUBLICATIONS

Mangaraj, S. et al. Food Engineering Reviews vol. 1 pp. 133-158 (Year: 2009).*

*Primary Examiner* — Irina S Zemel
*Assistant Examiner* — Jeffrey S Lenihan
(74) *Attorney, Agent, or Firm* — Quarles & Brady LLP

(57) ABSTRACT

The copolymerization of ethylene (E) and methoxy polyethylene glycol methacrylate (MPEGMA) produces the copolymer co-E-MPEGMA. These copolymers are distinct from polyethylene, e.g., low density polyethylene (LDPE) grafted with MPEGMA, i.e., g-E-MPEGMA, and are useful in the preparation of insulation sheaths for medium, high and extra-high voltage cables. Such cables exhibit good water tree retardance.

10 Claims, 1 Drawing Sheet

(56) References Cited

U.S. PATENT DOCUMENTS

2016/0209381 A1 7/2016 Ifrach
2018/0112020 A1* 4/2018 Lieber ................... C08F 218/08

* cited by examiner

ETHYLENE-METHOXY POLYETHYLENE GLYCOL METHACRYLATE COPOLYMERS

FIELD OF THE INVENTION

This invention relates to ethylene-methoxy polyethylene glycol methacrylate copolymers.

BACKGROUND OF THE INVENTION

Water trees in insulation layers of medium- to extra-high voltage power cables (made with peroxide crosslinked low density polyethylene, LDPE) have been known to cause electrical trees, which lead to cable failure. Solutions to inhibit water trees involve the incorporation of minor amounts of either a polar copolymer such as ethylene butyl acrylate (EBA) or polyethylene glycol (PEG). The mechanism of using PEG of a weight average molecular weight (Mw) as high as 20,000 grams per mole (g/mol) as water tree retardant (WTR) is believed to be that the PEG is mobile enough to move to the region of highest stress and fill the tree tips.

U.S. Pat. Nos. 4,812,505 and 9,058,918, and EP 0 966 003 and 1 731 565 teach PEG or a combination of PEG and glycerol fatty acid esters as WTR additives in combination. U.S. Pat. Nos. 6,274,239 and 8,269,109, US 2012/0031641, and EP 0 179 565 and 2 439 234 teach the use of various polar copolymers such as ethylene vinyl acetate (EVA), ethylene ethyl acrylate (EEA), or a combination of them for WTR properties.

WO 2016204949 A1 teaches a composition comprising a peroxide-crosslinked, high melt strength ethylene-based polymer, which is made in a tubular reactor. The composition has a dissipation factor measured at 130° C. (60 Hz, 2 kV) or 120° C. (60 Hz, 8 kV) or 100° C. (60 Hz 8 kV) of less than or equal to 0.5%.

U.S. Pat. No. 4,370,517 teaches that polyethylene grafted with methoxy polyethylene glycol 400 methacrylate (MPEG 400 MA) suppresses water tree, where the polyolefin contains 0.01 to 0.888% by weight of ester groups. In this invention, the polyethylene was produced as usual and the MPEG 400 MA was grafted on to it via reactions that were done during molding of the composition usually with peroxide initiators.

SUMMARY OF THE INVENTION

In one embodiment the invention is a reactor copolymer of ethylene and methoxy polyethylene glycol methacrylate (co-E-MPEGMA).

In one embodiment the invention is a crosslinkable composition comprising the co-E-MPEGMA. In one embodiment the co-E-MPEGMA comprises from greater than 0 to less than or equal to ($\leq$) 10 weight percent (wt %), or >0 to $\leq$5 wt %, or >0 to $\leq$1 wt %, or >0 to $\leq$0.5 wt % units derived from methoxy polyethylene glycol methacrylate (MPEGMA).

In one embodiment the invention is a crosslinkable composition comprising in weight percent based on the weight of the composition:
(A) 1-<100 wt % co-E-MPEGMA;
(B) $\geq$0-90 wt % of an ethylene-based polymer other than co-E-MPEGMA or a grafted ethylene-methoxy polyethylene glycol methacrylate (g-E-MPEGMA);
(C) 0-$\leq$5 wt % of a water tree retardant (WTR);
(D) 0-$\leq$2 wt % of an antioxidant; and
(E) 0-$\leq$3 wt % a crosslinking agent;
wherein the weight of the composition is 100 wt %.

In one embodiment the co-E-MPEGMA comprises >0 to $\leq$10 wt %, or >0 to $\leq$5 wt %, or >0 to $\leq$1 wt %, or >0 to $\leq$0.5 wt % MPEGMA.

In one embodiment the composition comprises >0 to $\leq$99 wt %, or >0 to $\leq$90 wt %, or >0 to $\leq$80 wt %, or >0 to $\leq$70 wt %, or >0 to $\leq$60 wt %, or >0 to $\leq$50 wt %, or >0 to $\leq$40 wt %, or >0 to $\leq$30 wt %, or >0 to $\leq$20 wt %, or >0 to $\leq$10 wt %, or >0 to $\leq$5 wt %, or >0 to $\leq$2 wt %, or >0 to $\leq$1 wt %, co-E-MPEGMA or g-E-MPEGMA.

In one embodiment the composition comprises greater than or equal to ($\geq$) 1 wt % to <100 wt %, or $\geq$2 wt % to >100 wt %, or $\geq$5 wt % to >100 wt %, or $\cong$10 wt % to >100 wt %, or $\geq$20 wt % to <100 wt %, or $\geq$30 wt % to <100 wt %, or $\geq$40 wt % to <100 wt %, or $\geq$50 wt % to <100 wt %, or $\geq$60 wt % to <100 wt %, or $\geq$70 wt % to <100 wt %, or $\geq$80 wt % to <100 wt %, ethylene-based polymer other than co-E-MPEGMA or g-E-MPEGMA. In one embodiment the ethylene-based polymer is a polyethylene. In one embodiment the polyethylene is a low density polyethylene (LDPE).

In one embodiment the WTR is present in an amount greater than zero (>0) wt %. In one embodiment the composition comprises >0 to 5 wt %, or greater than or equal to ($\geq$) 0.1 to 5 wt %, or $\geq$0.5 to 5 wt %, or $\geq$1 to 5 wt %, or $\geq$2 to less than or equal to ($\leq$) 4.5 wt %, or $\geq$2 to $\leq$4 wt %, WTR. In one embodiment the water tree retardant is a polyolefin glycol, e.g., polyethylene glycol (PEG) or polypropylene glycol (PPG).

In one embodiment the antioxidant is present in an amount greater than zero (>0) wt %. In one embodiment the composition comprises >0 to 2 wt %, or greater than or equal to ($\geq$) 0.01 to 2 wt %, or $\geq$0.05 to 2 wt %, or $\geq$0.1 to $\leq$1 wt %, antioxidant. In one embodiment the antioxidant is a hindered phenol or a hindered thiophenol.

In one embodiment the crosslinking agent is present in an amount greater than zero (>0) wt %. In one embodiment the composition comprises >0 to 3 wt %, or greater than or equal to ($\geq$) 0.01 to 3 wt %, or $\geq$0.05 to 3 wt %, or $\geq$0.1 to $\leq$2 wt %, or $\geq$0.1 to $\leq$1 wt %, crosslinking agent. In one embodiment the crosslinking agent is a peroxide. In one embodiment the peroxide is an organic peroxide, e.g., dicumyl peroxide.

In one embodiment the invention is an article comprising co-E-MPEGMA. In one embodiment, the article is an insulation layer of a wire or cable construction, particularly an insulation layer of a medium- to extra-high voltage power cable. In one embodiment the article is a coated conductor comprising a conductive core and an insulation layer which at least partially covers the conductive core, wherein the insulation layer comprises the co-E-MPEGMA.

Surprisingly, PEG in the non-mobile form (i.e., non-grafted copolymers of ethylene and methoxy polyethylene glycol methacrylate, or co-E-MPEGMA) can also provide WTR properties when used as the polymer to make peroxide crosslinked electrical insulation compositions.

Also surprisingly, co-E-MPEGMA (in which the content of methoxy polyethylene glycol methacrylate is 0.5 wt %) exhibits greater scorch-resistance at extrusion conditions (i.e., greater ts1 at 140° C.) than another co-E-MPEGMA (in which the content of methoxy polyethylene glycol methacrylate was 2.3 wt %), at similar melt index values of the two copolymers. ts1 refers to the time for one pound-inch (1 lb-in) increase in torque as measured by Moving Die Rheometer (MDR).

Another surprise is that a blend of LDPE with co-E-MPEGMA (in which the content of methoxy polyethylene glycol methacrylate is 0.5 wt %) exhibits synergistic scorch-resistance at extrusion conditions (i.e., greater ts1 at 140° C.) than that predicted from a linear combination of the two polymers. In contrast, the use of co-E-MPEGMA (in which the content of methoxy polyethylene glycol methacrylate is 2.3 wt %) in a blend with LDPE does not yield synergy in scorch-resistance characteristics.

In one embodiment the compositions of this invention are useful in the manufacture of insulation sheaths for medium-voltage cables. In one embodiment the compositions of this invention are useful in the manufacture of insulation sheaths for high- and extra-high voltage cables. In one embodiment the compositions of invention are useful in Direct Peroxide Injection processes (DPI).

DETAILED DESCRIPTION OF THE PREFERRED EMBODIMENTS

Definitions

Figure 1:
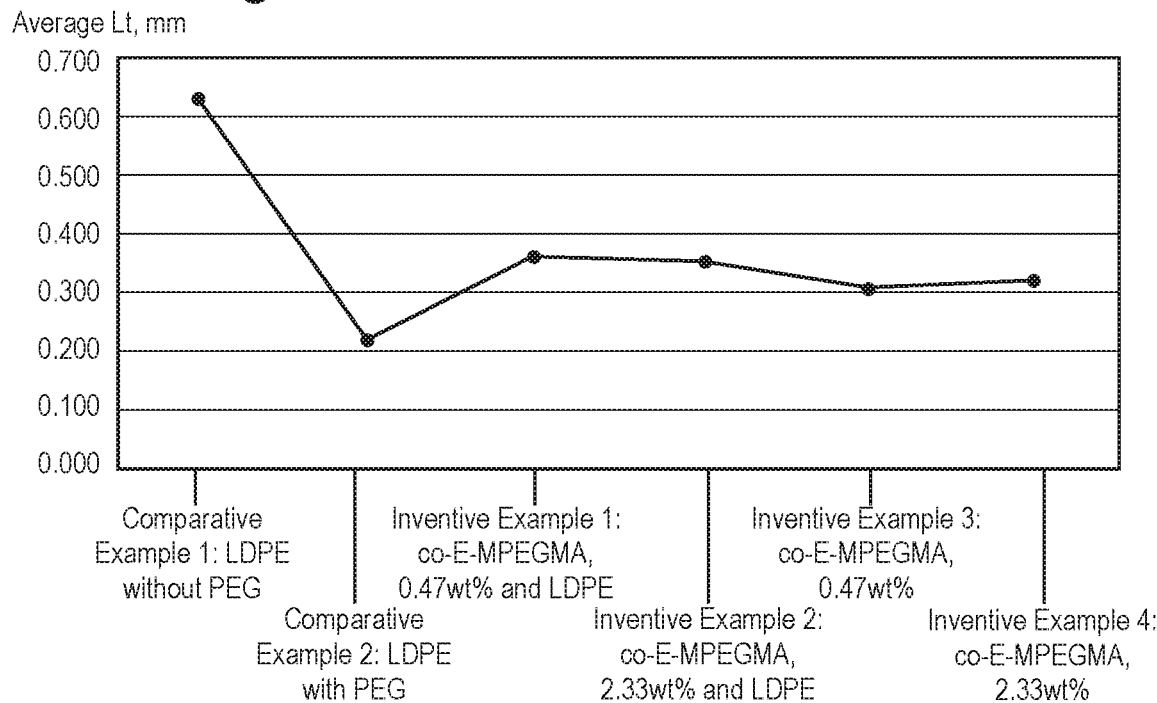
FIG. 1 is a line graph of the water tree retardant properties for all examples.
Figure 2:
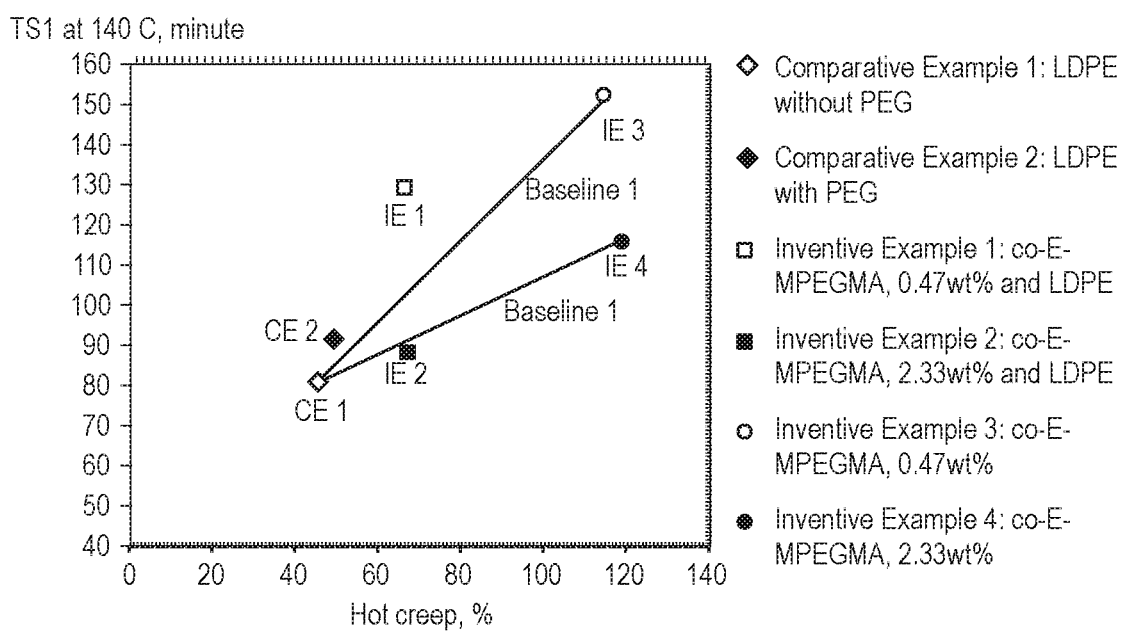
FIG. 2 is a line graph of the hot creep and scorch performance (ts1 at 140° C.) for all examples.

For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

Unless stated to the contrary, implicit from the context, or customary in the art, all parts and percents are based on weight and all test methods are current as of the filing date of this disclosure.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Composition" and like terms mean a mixture or blend of two or more components.

"Blend" and like terms mean an intimate physical mixture (that is, without reaction) of two or more substances, e.g., two or more polymers, or a polymer and a catalyst or an additive, etc. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more substances on the macro level (for example, melt blending resins or compounding) or the micro level (for example, simultaneous forming within the same reactor).

"Ethylene-based polymer" and like terms refer to a polymer containing, in polymerized form, a majority weight percent of units derived from ethylene based on the total weight of the polymer. Nonlimiting examples of ethylene-based polymers include low density polyethylene (LDPE), linear low density polyethylene (LLDPE), very low density polyethylene (VLDPE), ultra-low density polyethylene (ULDPE), medium density polyethylene (MDPE), high density polyethylene (HDPE), and functionalized polyethylene, e.g., ethylene vinyl acetate (EVA), ethylene ethyl acrylate (EEA), and the like.

"Cable," "power cable," and like terms refer to at least one wire or optical fiber within a protective jacket or sheath. "Sheath" is a generic term and is used in relation to cables, it includes insulation coverings or layers, protective jackets and the like. Typically, a cable is two or more wires or optical fibers bound together in a common protective jacket. The individual wires or fibers inside the jacket may be bare, covered or insulated. Combination cables may contain both electrical wires and optical fibers. The cable can be designed for low, medium, high and extra high voltage applications. "Extra high voltage cable" refers to cable rated to carry 161 or more kilovolts (kV). "High voltage cable" refers to cable rated to carry voltages of greater than or equal to (≥) 36 kV and less than or equal to (≤) 160 kV. "Medium voltage cable" refers to cable rated to carry voltages of ≥6 to ≤36 kV. "Low voltage cable" refers to cable rated to carry voltages of <6 kV. Typical cable designs are illustrated in U.S. Pat. Nos. 5,246,783, 6,496,629 and 6,714,707.

"Conductor" and like terms mean a metal wire or cable, typically copper or aluminum, used to transmit either electrical power and/or electrical signals. The conductor can be either uncoated or coated with one or more polymeric sheaths, e.g., semiconductive coating or layer, an insulation coating or layer, etc. In one embodiment a conductor is an optical fiber for the transmission of data and/or other information.

"Crosslinkable," "curable" and like terms indicate that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to peroxide).

MPEGMA means methoxy polyethylene glycol methacrylate.

co-E-MPEGMA means a reactor copolymer resulting from the copolymerization of ethylene and methoxy polyethylene glycol methacrylate. It is also referred to as a non-grafted copolymer of ethylene and methoxy polyethylene glycol methacrylate to distinguish it from g-E-MPEGMA.

g-E-MPEGMA means polyethylene grafted with methoxy polyethylene glycol methacrylate.

E-MPEGMA means either or both co-E-MPEGMA and g-E-MPEGMA, as required by the context in which E-MPEGMA is used.

"Free of E-MPEGMA" and like terms means that the polymer does not contain, or contains only an inconsequential amount, either incorporated into or grafted onto its backbone, of E-MPEGMA.

"Copolymerization conditions" and like terms generally refer to temperature, pressure, monomer concentrations, catalyst concentration, cocatalyst concentration, and the like necessary for the reaction of monomer and comonomer to for a copolymer.

Ethylene-Methoxy Polyethylene Glycol Methacrylate Reactor Copolymer (co-E-MPEGMA)

co-E-MPEGMA is formed from the copolymerization of ethylene and MPEGMA. The structure of MPEGMA is shown by Formula 1 below:

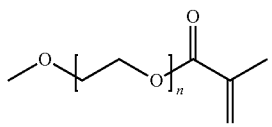

Formula 1 wherein n is an integer of 1 to 80, or 3 to 60, or 5 to 45. MPEGMA is a known compound made by known methods, e.g., it is commercially available from BASF. The number average molecular weight (Mn) of the MPEGMA used in the practice of this invention is typically from 144 to 3,600, or from 230 to 2,750, or from 320 to 2,100, grams per mole (g/mol).

MPEGMA is copolymerized with ethylene under conventional copolymerization conditions to form co-E-MPEGMA the structure of which is shown by Formula 2 below:

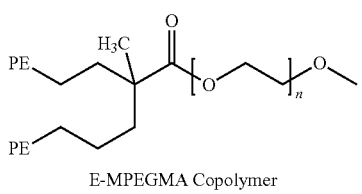

Formula 2

E-MPEGMA Copolymer

This structure provides an important benefit to the water retardant property of co-E-MPEGMA relative to g-E-MPEGMA prepared by grafting MPEGMA to a polyethylene (the structure of which is shown by Formula 3 below:

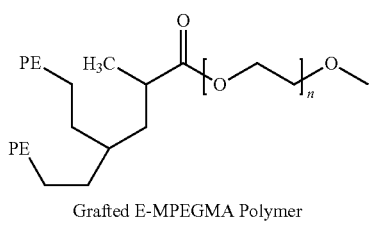

Formula 3

Grafted E-MPEGMA Polymer

In co-E-MPEGMA, the alpha and beta carbon atoms of the methacrylate group of the MPEGMA are incorporated into the backbone of the polyethylene In contrast, the alpha-carbon atom of the methacrylate group of g-E-MPEGMA is not incorporated into the backbone of the polyethylene.

Without being bound to theory, in order for a water tree retardant to work effectively, it must capture and bond with the water molecules that have entered the polymer matrix. This capture and binding typically requires the capturing and bonding group of the polymer to be flexible and unhindered. Relative to co-E-MPEGMA, the functional or bonding group of g-E-MPEGMA is more flexible than co-E-MPEGMA because it has less steric hindrance by virtue of its alpha-carbon atom of the methacrylate group being exo to, i.e., outside of, the polymer backbone. Because the alpha-carbon atom of methacrylate group of co-E-MPEGMA is incorporated in the polyethylene backbone, the structure is less flexible and more sterically hindered and thus is less likely to capture and bond with water. The fact that co-E-MPEGMA does effectively work as a water tree retardant (WTR) is surprising.

The minimum amount of MPEGMA incorporated into co-E-MPEGMA is typically at least 0.1 wt %, or 0.15 wt %, or 0.20 wt %, or 0.25 wt % based on the weight of the co-E-MPEGMA. The maximum amount of MPEGMA incorporated into co-E-MPEGMA can vary to convenience and is typically a function of diminishing returns and process practicalities. Typically the maximum amount does not exceed 10 wt %, or 5 wt %, or 1 wt %, or 0.5 wt % based on the weight of the co-E-MPEGMA.

In one embodiment co-E-MPEGMA containing 0.5 wt % or less of groups derived from MPEGMA exhibits greater scorch resistance at extrusion conditions (ts1 at 140° C.) than a co-E-MPEGMA of similar melt index value but containing more than 0.5 wt % of groups derived from MPEGMA.

In one embodiment a blend of co-E-MPEGMA containing 0.5 wt % or less of groups derived from MPEGMA and an ethylene-based polymer, particularly a low density polyethylene, exhibits synergistic scorch resistance at extrusion conditions (ts1 at 140° C.) than that predicted from a sum of individual scorch resistances of the two polymers. In one embodiment a blend of co-E-MPEGMA containing 0.5 wt % or less of groups derived from MPEGMA and an ethylene-based polymer, particularly a low density polyethylene, exhibits synergistic scorch resistance at extrusion conditions (ts1 at 140° C.) than a similar blend alike in all aspects except that the MPEGMA content of the co-E-MPEGMA was greater than 0.5 wt %, e.g., 2.3 wt %.

Ethylene-Based Polymer

In one embodiment the invention is a composition (i.e., blend) comprising co-E-MPEGMA and one or more ethylene-based polymers free of E-MPEGMA. Polyethylene, an ethylene-based polymer and, as that term is here used, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture of such homopolymers and copolymers. The mixture can be a mechanical blend or an in situ blend. Examples of the alpha-olefins are propylene, 1-butene, 1-hexene, 4-methyl-1-pentene, and 1-octene.

The polyethylene can be homogeneous or heterogeneous. The homogeneous polyethylenes usually have a polydispersity (Mw/Mn) in the range of 1.5 to 3.5 and an essentially uniform comonomer distribution, and are characterized by single and relatively low differential scanning calorimetry (DSC) melting points. The heterogeneous polyethylenes, on the other hand, have a molecular mass dispersity ($Đ_M$=Mw/Mn) greater than 3.5 and do not have a uniform comonomer distribution. Mw is defined as weight average molecular weight and Mn is defined as number average molecular weight. The density of the polyethylenes can range from 0.860 or less to 0.950 or more gram per cubic centimeter (g/cc), but typically they have a density in the range of 0.870 to 0.930 g/cc. They typically have a melt index in the range of 0.1 to 50 grams per 10 minutes (g/10 min). Density is measured according to ASTM D792, and melt index is measured according to ASTM D1238 (190° C./2.16 kg).

The polyethylenes can be produced by low or high pressure processes. They can be produced in the gas phase or in the liquid phase in solutions or slurries by conventional techniques. Low pressure processes are typically run at pressures below 1000 pounds per square inch (psi) whereas high pressure processes are typically run at pressures above 15,000 psi.

Typical catalyst systems (if required) which can be used to prepare these polyethylenes include the following: magnesium/titanium based catalyst systems, which are exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793, 5,342,907, and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems which use chromium or molybdenum oxides on silica-alumina supports can be included here. Typical processes for preparing the polyethylenes are also described in the aforementioned patents. Typical in situ polyethylene blends and processes and catalyst systems are described in U.S. Pat. Nos. 5,371,145 and 5,405,901. The various polyethylenes can include low density homopolymers of ethylene (LDPE) made by high pressure processes (HP-LDPE), linear low density polyethylenes (LLDPE), very low density polyethylenes (VLDPE), medium density polyethylenes (MDPE), and high density polyethylene (HDPE) having a density greater than 0.940 g/cc. The latter four polyethylenes are generally made by low pressure processes. A conventional high pressure process is described in *Introduction to Polymer Chemistry*, Stille, Wiley and Sons, New York, 1962, pages 149 to 151. The high pressure processes are typically free radical initiated polymerizations conducted in a tubular reactor or a stirred autoclave or a combination of the two. In the stirred autoclave, the pressure is in the range of 10,000 to 30,000 psi and the temperature is in the range of 175 to 250° C., and in the tube reactor, the pressure is in the range of 25,000 to 45,000 psi and the temperature is in the range of 200 to 350° C. LDPE, particularly HP-LDPE, are preferred polyethylenes for use in the practice of this invention.

Water Tree Retardant (WTR)

In one embodiment of the invention, the co-E-MPEGMA or a composition comprising co-E-MPEGMA can be used in combination with a water tree retardant (WTR). Any compound that will inhibit the formation of water treeing in the crosslinked polymer, i.e., co-E-MPEGMA or a composition comprising co-E-MPEGMA, under its end-use conditions can be used as a water tree retardant in the practice of this invention. For soaking or diffusing into the polymer, a low melting point, e.g., less than 70° C., preferably less than 50° C. and more preferably less than 35° C., water tree-resistant agent is preferred. Additionally, a eutectic mixture of a high molecular weight, e.g., not more than 1,000,000, preferably not more than 100,000 and more preferably not more than 50,000, weight average molar mass gram per mole (g/mol) that is a solid at 23° C. and a low molecular weight, e.g., less than 2,000, preferably less than 1,000 and more preferably less than 500, g/mol that is liquid at 23° C. can be used. Representative water tree-resistant agents include an alcohol of 6 to 24 carbon atoms (U.S. Pat. No. 4,206,260), an organo-silane, e.g., a silane containing an epoxy-containing radical, (U.S. Pat. No. 4,144,202), an inorganic ionic salt of a strong acid and a strong Zwitter-ion compound (U.S. Pat. No. 3,499,791), a ferrocene compound and a substitute quinoline compound (U.S. Pat. No. 3,956,420), a polyhydric alcohol, and a silicone fluid (U.S. Pat. No. 3,795,646). The polyglycols are a preferred class of water tree-resistant agents. Polyethylene glycol (PEG) with a weight average molar mass of less than 2,000, preferably less than 1,200 and more preferably less than 800, is a particularly preferred water tree-resistant agent, particularly for use with polyethylene, especially with LDPE. Vinyl end-capped PEG is a particularly preferred tree-resistant agent.

High molecular weight water tree-resistant agents that are solid at 23° C. can be introduced into the polymer, e.g., LDPE, by pre-compounding the agent into a polymer masterbatch or intermediate product, e.g., before soaking of liquid additives, which is then pelletized. If a masterbatch, the pellets can then be added directly to the polymer in the extruder to facilitate the incorporation of the agent while reducing the impact on extrusion efficiency, e.g., screw slippage. PEG with a weight average molar mass of less than 1,000,000, preferably less than 50,000 and more preferably less than 25,000, g/mol is a preferred agent for use in the masterbatch or intermediate product procedures, especially with polyethylene, particularly with LDPE.

Crosslinking Agent

The co-E-MPEGMA or composition comprising co-E-MPEGMA and an ethylene-based polymer, can be crosslinked by adding a crosslinking agent to the co-E-MPEGMA or composition. In one embodiment, the making of an article comprises crosslinking the co-E-MPEGMA or composition comprising co-E-MPEGMA, and typically the co-E-MPEGMA or composition comprising co-E-MPEGMA is crosslinked through the action of a peroxide.

The crosslinking of polymers with free radical initiators such as, but not limited to, a peroxide is well known. Generally, the peroxide, typically an organic peroxide, is incorporated into the polymer by melt blending in a roll mill, a biaxial screw kneading extruder, or a BANBURY™ or BRABENDER™ mixer at a temperature lower than the onset temperature for significant decomposition of the peroxide. Peroxides are judged for decomposition based on their half-life temperatures as described in *Plastic Additives Handbook*, Gachter et al, 1985, pages 646 to 649. An alternative method for organic peroxide incorporation into a polymeric compound is to mix liquid peroxide and pellets of the polymer in a blending device, such as a HENSCHEL™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Suitable crosslinking agents are organic peroxides such as dicumyl peroxide; 2,5-dimethyl-2,5-di(t-butylperoxy)

hexane; t-butyl cumyl peroxide; and 2,5-dimethyl-2,5-di(t-butylperoxy)hexane. In one embodiment, dicumyl peroxide is a preferred organic peroxide. In Direct Peroxide Injection (DPI) processes, 2,5-dimethyl-2,5-di(t-butylperoxy)hexane is a preferred organic peroxide since it is liquid at ambient conditions (23° C. and atmospheric pressure).

Peroxide curing agents are used in amounts of at least 0.5 wt % based on the weight of the composition. In various embodiments the peroxide curing agent is used in an amount of 0.5 to 10, or 0.7 to 5 or 1 to 3 wt % based on the weight of the composition. The peroxides can be used alone or in combination with various other known curing co-agents, boosters, and retarders, such as triallyl isocyanurate; ethoxylated bisphenol A dimethacrylate; α-methyl styrene dimer (AMSD); and other co-agents described in U.S. Pat. Nos. 5,346,961 and 4,018,852.

As an alternative, or in addition, to the use of peroxides for the crosslinking of the compositions of this invention, other approaches for crosslinking of polymers may be used to effect the desired degree of crosslinking. Such approaches and technologies are well known to those skilled in the art and include, but are not limited to, radiation crosslinking, moisture crosslinking, bisulfonyl azide crosslinking, crosslinking with hydroxyl terminated polydimethylsiloxane (PDMS), etc. In some cases, it would be necessary for the polymers used in the practice of this invention to be functionalized appropriately to enable crosslinking (for example, with alkoxy silanes in the case of moisture crosslinking or crosslinking with hydroxyl terminated PDMS).

Additives

Conventional additives, other than the WTR and crosslinking agent, are exemplified by antioxidants, coupling agents, ultraviolet absorbers or stabilizers, antistatic agents, pigments, dyes, nucleating agents, reinforcing fillers or polymer additives, carbon black, slip agents, plasticizers, processing aids, lubricants, viscosity control agents, tackifiers, anti-blocking agents, surfactants, extender oils, metal deactivators, voltage stabilizers, flame retardant fillers and additives, boosters and catalysts, and smoke suppressants. Fillers and additives can be added in amounts ranging from less than about 0.1 to more than about 200 parts by weight for each 100 parts by weight of the base resin, e.g., co-E-MPEGMA alone or in combination with one or more ethylene-based resins.

Examples of antioxidants are: hindered phenols such as tetrakis[methylene(3,5-di-tert-butyl-4-hydroxyhydrocinnamate)]methane, bis kbeta-(3,5-ditert-butyl-4-hydroxybenzyl)-methylcarboxyethyl)]sulphone, 4,4'-thiobis(2-t-butyl-5-methylphenol), and thiodiethylene bis(3,5-di-tert-butyl-4-hydroxy)-hydrocinnamate; phosphites and phosphonites such as tri(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline and diphenylamines. Antioxidants can be used in amounts of 0.1 to 5 parts by weight per 100 parts by weight based on the weight of the base resin, e.g., co-E-MPEGMA alone or in combination with a polyethylene.

Compounding, Fabrication and Articles of Manufacture

Compounding of the compositions of this invention can be performed by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER and PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

The compounding temperature for the polymer blend and any additives/fillers is typically from the melting point of the polyethylene, e.g., 120° C., to 220° C., more typically from 160 to 210° C. The various components of the final composition can be added to and compounded with one another in any order, or simultaneously, but typically the polymer blend is first compounded followed by the incorporation of the additive package.

In some embodiments the additives are added as a premixed masterbatch. Such masterbatches are commonly formed by dispersing the additives, either separately or together, into an inert plastic resin, e.g., one of the plastic matrix components or a low density polyethylene. Masterbatches are conveniently formed by melt compounding methods.

In one embodiment, the polymer composition of this invention can be applied as a covering to a cable, e.g., like a sheath or insulation layer, in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to above the melting point of the polymer (but below the decomposition point of the polymer) until the article has reached the desired degree of crosslinking. Cure may begin in the reactor-extruder.

In one embodiment the compositions of this invention are useful in the Direct Peroxide Injection (DPI) process for manufacturing cable insulation and protective jackets. In one embodiment, the DPI process consists of a mixer, e.g., a turbomixer from LICO Spa, and an extruder, e.g., a single screw fabricating extruder. In this process, which is well known in the art (e.g., EP 0 472 949 A1), peroxide (typically a liquid organic peroxide) and, optionally, other additives, typically liquid additives, e.g., one or more liquid antioxidants, are metered and mixed into the polymer in the mixer and then the polymer blended with peroxide and optional additives is continuously fed into the extruder. The DPI process eliminates the need for compounding the peroxide and optional additives at compounders, and thus saves raw material cost for the cable fabricators.

In one embodiment the invention is a method or process of preparing an insulation sheath for a cable, the method comprising the steps of (1) feeding co-E-MPEGMA to an extruder, (2) injecting peroxide into the extruder and onto the co-E-MPEGMA, (3) mixing the peroxide and co-E-MPEGMA in the extruder to form a blend of peroxide and co-E-MPEGMA, and (4) extruding the blend of (3) onto a coated or uncoated conductor.

Other articles of manufacture that can be prepared from the polymer compositions of this invention include fibers, ribbons, sheets, tapes, pellets, tubes, pipes, weather-stripping, seals, gaskets, foams, footwear and bellows. These articles can be manufactured using known equipment and techniques.

The invention is described more fully through the following examples. Unless otherwise noted, all parts and percentages are by weight.

EXAMPLES

Test Methods

Hot creep is measured to determine the degree of cure (crosslinking) and hot set is used to measure the sample relaxation after hot creep elongation. Testing is based on the ICEA-T-28-562-2003 method for power cable insulation materials. Hot creep testing is conducted on 50 mil (1.3 mm) thick samples in an oven with a glass door at 150° C. or 200° C. with a force of 0.2 MPa stress applied to the bottom of the specimens. Three test specimens for each sample are cut using ASTM D 412 type D tensile bars. The samples are elongated for 15 minutes where the percentage increases in length are measured and the average values of the three specimens are reported as "hot creep". The hot set values are obtained for the same samples undergoing hot-creep testing, after removing the load for 5 minutes under heat and cooling them at room temperature for 10 minutes. A sample is considered to have "failed" if it breaks during the test or yields hot creep greater than (>) 175%.

Moving Die Rheometer (MDR) analyses are performed on the compounds using Alpha Technologies Rheometer MDR model 2000 unit. The test is based on ASTM procedure D 5289, "Standard Test Method for Rubber—Property Vulcanization Using Rotorless Cure Meters". The MDR analyses are performed using 4-5 grams of material. Samples are tested at 182° C. for 12 minutes or at 140° C. for 120 or 180 minutes at 0.5 degrees arc oscillation for both temperature conditions. Samples are tested of material that contains all necessary additives, including the crosslinking agents. Resistance to premature crosslinking at extrusion conditions ("scorch") is assessed by ts1 (time for 1 lb-in increase in torque) at 140° C. Ultimate degree of crosslinking is reflected by MH (maximum torque)–ML (minimum torque) at 182° C.

Water tree growth rate test is carried out according to the test standard ASTM D6097. Specimen in the test has a diameter of 1 inch (25.4 mm), a thickness of 250 mil (6.35 mm), and a standard conical defect where water tree could grow. After conditioning in a vacuum oven at 80° C. for 7 days, the specimen is placed in a 0.01 N sodium chloride (NaCl) solution under 2 kilovolts (kV) at 1 kilohertz (kHz) for 30 days aging. Then, the specimen is taken out of the NaCl solution and stained with a dye (e.g., methylene blue). Slices with thickness between 0.25 to 0.65 mm are cut through the conical defect. The slices are then placed on a 1" (25.4 mm)×3" (76.2 mm) frosted end glass microscope slide, from which optical microscopic images are obtained. The length of the water tree ($L_t$) is measured for each sample. Ten samples are tested and the average of $L_t$ is reported.

Dissipation Factor (DF) and dielectric constant (DC) testing is conducted on cured 50 mil (1.3 mm) plaques. The plaques are degassed in a vacuum oven at 60° C. for five days. DF testing is carried out according to ASTM D150 at 60 Hz on a GUILDLINE™ High Voltage Capacitance Bridge unit, Model 9920A, with a TETTEX™ specimen holder and a TETTEX™ AG Instruments Temperature Control Unit. Samples are tested at 60 Hz and 2 kV applied stress at temperatures of 25° C., 40° C., 90° C., and 130° C.

AC breakdown strength ("ACBD"), also known as AC dielectric strength, is tested on specimens cut from nominal 40-mil (1.016-mm) thick crosslinked plaques using a HIPOTRONICS™ D-149 Series AC Dielectric Strength Tester with external cell (electrodes configuration: top—0.5 inch diameter, bottom—1 inch diameter), at a rate of 0.5 kV/second ramp voltage for three temperatures (23° C., 90° C., and 120° C.).

Inventive Examples 1 to 4 (IE1 to IE4) and Comparative Examples 1 to 2 (CE1 to CE2)

The compositions are shown in Table 2. The polymers are as follows: LDPE (available from The Dow Chemical Company) of 0.922 g/cc density (ASTM D792) and 1.8 g/10 min melt index (12) (ASTM D1238); the co-E-MPEGMA copolymers are made in an autoclave mini-plant from ethylene and methoxy polyethylene glycol methacrylate. The chain transfer agent (CTA) is propylene. The methoxy polyethylene glycol methacrylate (MPEGMA) monomer or oligomer has a number average molecule weight (Mn) of 500 g/mol. co-E-MPEGMA, 0.5 wt % copolymer has MPEGMA level of 0.5 wt % and melt index of 3.74 g/10 min, while co-E-MPEGMA, 2.3 wt % copolymer has MPEGMA level of 2.3 wt % and melt index of 3.67 g/10 min. Melt index refers to that measured at 190° C. using 2.16 kg load.

Details of co-E-MPEGMA Synthesis

Monomer—Undiluted poly(ethylene glycol) methyl ether methacrylate is loaded into a 316 stainless steel supply vessel, and diluted with ethyl acetate, to produce a final concentration of 8.0 wt %. This vessel is purged with nitrogen for three hours before use, and kept under 70 pounds per square inch (psig) nitrogen pad during operation.

Initiators—Peroxide initiator tert-butyl peroxyacetate (TPA, 20% by weight solution in ISOPAR™ H) and peroxide initiator di-tert-butyl peroxide (DTBP, 20% by weight solution in ISOPAR™ H) are combined with ISOPAR™ E in a second 316 stainless steel supply vessel to produce 8500 mass ppm TPA and 1881 mass ppm DTBP, a ratio of 5:1 mole TPA/mole DTBP. The vessel is padded and de-padded five times with 70 psig nitrogen before use and kept under nitrogen pad during operation.

MPEGMA Modified LDPE (co-E-MPEGMA, 0.5 wt %)—Ethylene is injected at 5444 grams per hour (g/h) (194 moles/h), at a pressure of 1930 bar, into an agitated (1600 rpm) 300 mL, high pressure continuous stirred tank reactor (CSTR) autoclave, with an external heating jacket set at about 215° C. Propylene (chain transfer agent or "CTA") is added to the ethylene stream at a pressure of 62 bar, and at a rate of 94.7 g/h (2.25 mole/h), before the mixture is compressed to 1930 bar, and injected into the reactor. The solution of MPEGMA in ethyl acetate is pumped at a pressure of 1930 bar, and at a rate of 52.5 mL/h into the ethylene-propylene mixture, before said mixture is injected into the reactor. The peroxide initiator is added directly to the reactor, through the sidewall, at a pressure of 1930 bar, and at a rate of $22.0 \times 10^{-2}$ g/h (1.66 millimoles/hour (mmol/h)) of TPA and $4.8 \times 10^{-2}$ g/h (0.33 mmol/h) of DTBP. The ethylene conversion to polymer is 12.1 wt %, based on the mass of ethylene entering the reactor, and the average reaction temperature is 244° C. An ethylene-based polymer with a melt index (12) of 3.74 g/10 min is formed.

Monomer—Undiluted poly(ethylene glycol) methyl ether methacrylate is loaded into a 316 stainless steel supply vessel, and diluted with ethyl acetate, to produce a final concentration of 30.0 wt %. This vessel is purged with nitrogen for three hours before use, and kept under 70 pounds per square inch (psig) nitrogen pad during operation.

Initiators—Peroxide initiator tert-butyl peroxyacetate (TPA, 20% by weight solution in ISOPAR™ H) and peroxide initiator di-tert-butyl peroxide (DTBP, 20% by weight solution in ISOPAR™ H) are combined with ISOPAR™ E in a second 316 stainless steel supply vessel to produce 8500 mass ppm TPA and 1881 mass ppm DTBP, a ratio of 5:1 mole TPA/mole DTBP. The vessel is padded and de-padded five times with 70 psig nitrogen before use and kept under nitrogen pad during operation.

MPEGMA Modified LDPE (co-E-MPEGMA, 2.3 wt %)—Ethylene is injected at 5444 grams per hour (g/h) (194 moles/h), at a pressure of 1930 bar, into an agitated (1600 rpm) 300 mL, high pressure continuous stirred tank reactor (CSTR) autoclave, with an external heating jacket set at about 215° C. Propylene (chain transfer agent or "CTA") is added to the ethylene stream at a pressure of 62 bar, and at a rate of 65.8 g/h (1.56 mole/h), before the mixture is compressed to 1930 bar, and injected into the reactor. The solution of MPEGMA in ethyl acetate is pumped at a pressure of 1930 bar, and at a rate of 80.2 mL/h into the ethylene-propylene mixture, before said mixture is injected into the reactor. The peroxide initiator is added directly to the reactor, through the sidewall, at a pressure of 1930 bar, and at a rate of $22.0 \times 10^{-2}$ g/h (1.66 millimoles/hour (mmol/h)) of TPA and $4.8 \times 10^{-2}$ g/h (0.33 mmol/h) of DTBP. The ethylene conversion to polymer is 13.1 wt %, based on the mass of ethylene entering the reactor, and the average reaction temperature is 246° C. An ethylene-based polymer with a melt index (12) of 3.67 g/10 min is formed.

LUPEROX™ 101 peroxide (high-temperature decomposing peroxide with half-life temperatures for 1 hour (h) and 10 h of 140.3° C. and 120.3° C., respectively, measured in dodecane, and available from Arkema) is used as the crosslinking agent. LOWINOX™ TBM-6 stabilizer, a hindered thiophenol, is used as the antioxidant (AO) in the formulations.

All the components (except the peroxide) are blended in a 420 ml BRABENDER™ mixing bowl with CAM blades at 30 revolutions per minute (rpm) rotor speed at 180° C. jacket temperature for one minute (after loading). The jacket temperature is then increased to 190° C. and the melt is fluxed and compounded for 3 minutes to achieve homogeneous mixing. The polymer melt is taken out of the mixing bowl, flattened in a cool press, cut into small stripes using a guillotine plaque cutter, and are then pelletized into small pieces by a BERLYN™ pelletizer. These small pieces are fed into a BRABENDER™ single screw extruder at 40 rpm with a barrel profile of 120° C./130° C./140° C./150° C., a screen pack of 20/40 and a conventional conveying single screw. The resulting polymer strand is cut into uniform pellets using the BERLYN™ pelletizer.

The compounded pellets are heated in a 70° C. oven for at least 4 hours. LUPEROX™ 101 is transferred to the pellets in a glass jar using a syringe. The jar is shaken well and then placed on the Stoneware tumbler with 30 rpm for 10 minutes until all liquids are absorbed into the pellets. The full compounds are put into a 70° C. oven for overnight. The resulting pellets are evaluated as such (or compression molded to various thicknesses for testing).

The pellets are tested in a moving die rheometer at 140° C. or 182° C. (for evaluation of crosslinking characteristics). For water tree growth measurement, the compositions are compression molded at the following conditions: 500 pounds per square inch (psi) (3.5 MPa) at 180° C. for 5 minutes, followed by 2500 psi (17 MPa) at the same temperature for 5 minutes, slow cooling to 30° C. at this pressure, and opening the press to remove the molded plaque. For hot creep and electrical measurements, the compositions are compression molded at the following conditions to make completely crosslinked specimens of different thicknesses: 500 psi (3.5 MPa) at 125° C. for 3 minutes, followed by 2500 psi (17 MPa) at this temperature for 3 minutes and 2500 psi (17 MPa) at 180° C. for 12 minutes, cooling to 30° C. at this pressure, and opening the press to remove the molded plaque.

The properties of the compositions are given in Table 2. CE1 is LDPE only formulation that is known to exhibit bad WTR properties. CE2 involved PEG 20000 as WTR additive in the LDPE based formulation. IE1 to IE4 did not contain PEG. IE1 consisted of 50 wt % of co-E-MPEGMA, 0.5 wt % copolymer and 49.625 wt % of LDPE, while IE2 contained 50 wt % of co-E-MPEGMA, 2.3 wt % copolymer and 49.625 wt % of LDPE. IE3 and IE4 are based on only co-E-MPEGMA copolymers. By using co-E-MPEGMA copolymers in the formulations, the water tree length ($L_t$) decreases unexpectedly, as shown in IE1 to IE4 relative to CE1 (FIG. 1).

All the hot creep values are desirably less than 175%. From the moving die rheometer and hot creep results, the use of co-E-MPEGMA, 0.5 wt %/LDPE blend (IE1) exhibits better scorch resistance than co-E-MPEGMA, 2.3 wt %/LDPE blend (IE2) while the cure performances of the two are similar (FIG. 3). In FIG. 3, two baselines from CE1 to IE3 and IE4 are drawn. The scorch-cure balance is improved if the blend of co-E-MPEGMA and LDPE falls above the baseline and vice versa. Unexpectedly, IE1 is much above baseline 1 while IE2 is slightly below baseline 2.

TABLE 1

Polymers and Their Properties

|  | MPEGMA Modified LDPE (co-E-MPEGMA, 0.5 wt %) | MPEGMA Modified LDPE (co-E-MPEGMA, 2.3 wt %) | Conventional LDPE |
|---|---|---|---|
| Density g/cc | 0.920 | 0.923 | 0.922 |
| I$_2$ dg/min (190° C.) | 3.74 | 3.67 | 1.8 |
| Melt Strength (cN) at 190° C. | 8.2 | 8.8 | 8.1 |

TABLE 2

Compositions and Properties of CE1-CE2 and IE1-IE

|  | CE1 | CE2 | IE1 | IE2 | IE3 | IE4 |
|---|---|---|---|---|---|---|
|  | \multicolumn{6}{c}{Sample Number} | | | | | |
|  | 1 | 2 | 3 | 4 | 5 | 6 |
| Composition (wt %) | | | | | | |
| LDPE | 99.625 | 99.025 | 49.625 | 49.625 | | |
| PEG 20000 |  | 0.6 | | | | |

TABLE 2-continued

Compositions and Properties of CE1-CE2 and IE1-IE

| | CE1 | CE2 | IE1 | IE2 | IE3 | IE4 |
|---|---|---|---|---|---|---|
| | | | Sample Number | | | |
| | 1 | 2 | 3 | 4 | 5 | 6 |
| TBM-6 | 0.375 | 0.375 | 0.375 | 0.375 | 0.375 | 0.375 |
| co-E-MPEGMA, 0.5 wt % | | | 50 | | 99.625 | |
| co-E-MPEGMA, 2.3 wt % | | | | 50 | | 99.625 |
| Unsoaked Intermediate Total | 100.00 | 100.00 | 100.00 | 100.00 | 100.00 | 100.00 |
| Unsoaked Intermediate | 98.6 | 98.6 | 98.6 | 98.6 | 98.6 | 98.6 |
| LUPEROX ™ 101 | 1.4 | 1.4 | 1.4 | 1.4 | 1.4 | 1.4 |
| Total | 100.00 | 100.00 | 100.00 | 100.00 | 100.00 | 100.00 |
| Properties | | | | | | |
| $L_f$, mm-after crosslinking | 0.630 | 0.220 | 0.360 | 0.352 | 0.311 | 0.320 |
| MDR: MH at 182° C. (lb in) | 3.27 | 3.21 | 2.79 | 2.66 | 2.16 | 2.12 |
| MDR: ML at 182° C. (lb in) | 0.16 | 0.16 | 0.10 | 0.12 | 0.06 | 0.08 |
| MDR: ts1 at 140° C. (minutes) | 81.04 | 91.81 | 129.9 | 88.16 | 152.26 | 116.12 |
| Hot creep at 150° C., 20N (%)-after crosslinking | 44.9 | 48.91 | 66.56 | 65.91 | 114.54 | 118.78 |
| Dissipation Factor at 2 kV, 23° C., 60 Hz (%)-after crosslinking | 0.000272 | 0.000345 | 0.00027 | 0.000342 | 0.00029 | 0.00045 |
| Dissipation Factor at 2 kV, 90° C., 60 Hz (%)-after crosslinking | 0.000143 | 0.000122 | 0.000155 | 0.000183 | 0.000219 | 0.000239 |
| Dissipation Factor at 2 kV, 120° C., 60 Hz (%)-after crosslinking | 0.001282 | n/a | 0.000738 | 0.000858 | 0.00076 | 0.001068 |
| ACBD, 23° C. (kV/mm)-after crosslinking | 31.345 | 31.036 | 31.089 | 30.768 | 30.59 | 29.917 |
| ACBD, 90° C. (kV/mm)-after crosslinking | 30.677 | 31.456 | 30.638 | 31.261 | 31.521 | 31.501 |
| ACBD, 120° C. (kV/mm)-after crosslinking | n/a | 32.271 | 29.121 | 30.682 | 30.412 | 28.630 |

What is claimed is:

1. A crosslinkable composition comprising in weight percent based on the weight of the composition:
   (A) 1 to <100 wt % of a co-E-MPEGMA wherein the co-E-MPEGMA consists of (i) ethylene and (ii) methoxy polyethylene glycol methacrylate (MPEGMA);
   (B) >0 to 90 wt % of an ethylene-based polymer other than co-E-MPEGMA or a grafted ethylene-methoxy polyethylene glycol methacrylate g-E-MPEGMA;
   (C) from greater than 0 to ≤5 wt % of a water tree retardant (WTR);
   (D) 0 to ≤2 wt % of an antioxidant; and
   (E) 0 to ≤3 wt % a crosslinking agent;
   wherein the weight of the composition is 100 wt %.

2. The crosslinkable composition of claim 1 in which the ethylene-based polymer is a low density polyethylene (LDPE).

3. The crosslinkable composition of claim 1 in which the WTR is a polyethylene glycol.

4. The crosslinkable composition of claim 1 in which the crosslinking agent is a peroxide.

5. The crosslinkable composition of claim 1, wherein the MPEGMA contains from 1 to 80 repeating units of ethylene glycol.

6. An article comprising:
   a coated conductor comprising
   a conductive core and an insulation layer at least partially covering the conductive core, wherein the insulation layer comprises a co-E-MPEGMA consisting of (i) ethylene and (ii) methoxy polyethylene glycol methacrylate (MPEGMA).

7. The article of claim 6 wherein the co-E-MPEGMA consists of from 0.1 wt % to 10 wt % units derived from MPEGMA and from 50 to 99.1 wt % units derived from ethylene.

8. The article of claim 6 wherein the insulation layer is an insulation layer of a medium- to extra-high voltage power cable.

9. A method of conducting electricity, the method comprising the step of applying a voltage across the conductive core of the coated conductor of claim 6 so as to generate a flow of electricity through the conductive core.

10. The article of claim 6, wherein the MPEGMA contains from 1 to 80 repeating units of ethylene glycol.

* * * * *